(12) United States Patent
Olovsson

(10) Patent No.: US 10,746,708 B2
(45) Date of Patent: Aug. 18, 2020

(54) ROTARY VALVE AND A CHROMATOGRAPHY SYSTEM

(71) Applicant: GE HEALTHCARE BIO-SCIENCES AB, Uppsala (SE)

(72) Inventor: Bjorn Markus Olovsson, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 0 days.

(21) Appl. No.: 15/562,632

(22) PCT Filed: Mar. 23, 2016

(86) PCT No.: PCT/EP2016/056404
§ 371 (c)(1),
(2) Date: Sep. 28, 2017

(87) PCT Pub. No.: WO2016/156152
PCT Pub. Date: Oct. 6, 2016

(65) Prior Publication Data
US 2018/0106769 A1 Apr. 19, 2018

(30) Foreign Application Priority Data
Mar. 30, 2015 (GB) .................................. 1505421.6

(51) Int. Cl.
*F16K 11/074* (2006.01)
*G01N 30/20* (2006.01)

(52) U.S. Cl.
CPC .......... *G01N 30/20* (2013.01); *F16K 11/0743* (2013.01); *G01N 2030/202* (2013.01)

(58) Field of Classification Search
CPC ................ F16K 11/074; F16K 11/076; G01N 2030/202; Y10T 137/76509; Y10T 137/86566
See application file for complete search history.

(56) References Cited

U.S. PATENT DOCUMENTS 3,477,207 A * 11/1969 Auger ..................... F16K 3/04
137/625.46
4,068,528 A * 1/1978 Gundelfinger ......... G01N 30/20
73/864.84

(Continued)

FOREIGN PATENT DOCUMENTS

CN 106321896 A 1/2017
JP 2012-026938 A 2/2012

(Continued)

OTHER PUBLICATIONS

PCT International Search Report and Written Opinion for PCT Application No. PCT/EP2016/056404 dated Jun. 23, 2016 (16 pages).

(Continued)

*Primary Examiner* — Seth W. Mackay-Smith
(74) *Attorney, Agent, or Firm* — Eversheds Sutherland (US) LLP

(57) ABSTRACT

The present invention relates to a rotary valve and to a chromatography system comprising such a rotary valve. The rotary valve comprising a stator with an inner stator face, and a rotor with an inner rotor face arranged in sealing contact with the inner stator face, the rotor (1) is rotatably movable to a plurality of rotor positions about a rotational axis (RA) relative to the inner stator face (202), wherein the stator comprises ports and orifices and the rotor comprises two or more rotor interconnection paths for selective fluidic interconnection of said orifices with respect to the rotor position and wherein the rotor interconnection paths are arranged to in a rotary position connect the first orifice (S) to the fourth orifice (LF), the second orifice (W) to the third orifice (LE). And in a rotary position connect the eight orifice (SP) to the seventh orifice (PCFP). And in a rotary position connect the eight orifice (SP) to the fifth orifice (TC), the sixth orifice (FC) to the seventh orifice (PCFP).

(Continued)

And in a rotary position connect the eight orifice (SP) to the third orifice (LE), the fourth orifice (LF) to the fifth orifice (TC), the sixth orifice (FC) to the seventh orifice (PCFP).

4 Claims, 6 Drawing Sheets

(56) References Cited

U.S. PATENT DOCUMENTS

| | | | | |
|---|---|---|---|---|
| 4,705,627 A * | 11/1987 | Miwa | ............... | B01D 15/1842 |
| | | | | 137/625.46 |
| 5,601,115 A * | 2/1997 | Broerman | ........... | F16K 11/0743 |
| | | | | 137/595 |
| 5,803,117 A | 9/1998 | Olsen et al. | | |
| 6,012,487 A * | 1/2000 | Hauck | ............... | F16K 11/0743 |
| | | | | 137/625.11 |
| 6,012,488 A * | 1/2000 | Nichols | ............... | F16K 11/0743 |
| | | | | 137/625.11 |
| 6,155,123 A * | 12/2000 | Bakalyar | ............... | G01N 30/20 |
| | | | | 73/61.55 |
| 6,161,583 A * | 12/2000 | Morris | ............... | F15B 13/0406 |
| | | | | 137/625.21 |
| 6,550,496 B2 * | 4/2003 | Tiemann | ............... | F16K 11/074 |
| | | | | 137/625.46 |
| 6,672,336 B2 * | 1/2004 | Nichols | ............... | F16K 11/074 |
| | | | | 137/625.11 |
| 7,503,203 B2 * | 3/2009 | Gamache | ............... | F16K 11/074 |
| | | | | 137/51 |
| 7,823,468 B2 * | 11/2010 | Davison | ............... | G01N 30/20 |
| | | | | 137/625.16 |
| 8,186,381 B2 * | 5/2012 | Wilen | ............... | F16K 11/074 |
| | | | | 137/580 |
| 8,186,382 B2 * | 5/2012 | Wilen | ............... | F16K 11/074 |
| | | | | 137/625.46 |
| 8,225,817 B2 * | 7/2012 | Wilen | ............... | F16K 11/0743 |
| | | | | 137/625.18 |
| 8,286,663 B2 * | 10/2012 | Kallback | ............... | F16K 11/0743 |
| | | | | 137/625.15 |
| 8,322,374 B2 | 12/2012 | Tomita | | |
| 8,770,046 B2 * | 7/2014 | Maeda | ............... | G01N 30/20 |
| | | | | 73/863.01 |
| 8,770,226 B2 * | 7/2014 | Wilen | ............... | F16K 11/0743 |
| | | | | 137/625.46 |
| 8,960,231 B2 * | 2/2015 | Picha | ............... | G01N 30/20 |
| | | | | 137/625.46 |
| 9,435,773 B2 * | 9/2016 | Glatz | ............... | G01N 30/20 |
| 9,541,207 B1 * | 1/2017 | Saetveit | ............... | F16K 11/0743 |
| 9,671,376 B2 | 6/2017 | Yasunaga et al. | | |
| 10,302,603 B2 * | 5/2019 | Olovsson | ............... | F16K 11/0743 |
| 10,309,938 B2 * | 6/2019 | Olovsson | ............... | B01D 15/1842 |
| 2013/0067997 A1 * | 3/2013 | Ebsen | ............... | G01N 30/20 |
| | | | | 73/61.55 |
| 2013/0068977 A1 | 3/2013 | Picha et al. | | |

FOREIGN PATENT DOCUMENTS

| | | |
|---|---|---|
| WO | 2008/103098 A1 | 8/2008 |
| WO | 2008/140374 A1 | 11/2008 |
| WO | 2008/143077 A1 | 11/2008 |
| WO | 2010/056189 A1 | 5/2010 |
| WO | 2010/068274 A1 | 6/2010 |

OTHER PUBLICATIONS

GB Search Report for GB Application No. 1505421.6 dated Jan. 12, 2016 (4 pages).
Chinese Office Action for CN Application No. 201680019723.3 dated May 13, 2019 (12 pages with English translation).
Japanese Office Action for JP Application No. 2017-550107 dated Jan. 27, 2020 (6 pages with English translation).

* cited by examiner

ROTARY VALVE AND A CHROMATOGRAPHY SYSTEM

CROSS REFERENCE TO RELATED APPLICATIONS

This application claims the priority benefit of PCT/EP2016/056404 filed on Mar. 23, 2016 which claims priority benefit of Great Britain Application No. 1505421.6 filed Mar. 30, 2015. The entire contents of which are hereby incorporated by reference herein.

TECHNICAL FIELD

The present invention relates to valves in chromatography systems. In particular, the present invention relates to rotary valves and chromatography systems using such valves.

BACKGROUND

Valves are commonly used in devices that involve the transportation of a fluid. A typical type of valve, for example used in laboratory systems of moderate sizes, is the rotary valve.

Generally, a rotary valve has a stationary body, herein called a stator, which co-operates with a rotating body, herein called a rotor.

The stator is provided with a number of inlet and outlet ports. The ports are via bores in fluid communication with a corresponding set of orifices on an inner stator face. The inner stator face is an inner surface of the stator that is in fluid tight contact with an inner rotor face of the rotor. The rotor is typically formed as a disc and the inner rotor face is pressed against the inner stator face in rotating co-operation. The inner rotor face is provided with one or more grooves which interconnect different orifices depending on the rotary position of the rotor with respect to the stator.

Rotary valves can be designed to withstand high pressures (such as pressures above 25 MPa). They can be made from a range of materials, such as stainless steel, high performance polymeric materials and ceramics.

The number of inlets/outlets as well as the design of grooves in the rotor or the stator reflects the intended use of a specific valve. A common type of multi-purpose valve has one inlet port (typically placed in the rotary axis of the valve) and a number of outlets ports that are placed equidistantly around the inlet port. The rotor has a single, radially extending groove that has one end in the rotary centre, thereby always connecting to the inlet, while the other end connects to any one of the outlets depending on the angular position of the rotor with respect to the stator. Such a valve is useful to direct a flow from the inlet to any of the outlets—one at a time.

Chromatography systems known in the art often comprises a separate injection rotary valve and a separate column rotary valve. Some chromatography systems comprises a single rotary valve which requires manual connection and disconnection of the necessary connection tubings for the syringe and the column. This manual connection and disconnection is associated with several potential problems, such as: risk of errors in the connection of the tubing/capillaries, wear of connectors, limited possibility to automate the operation of the chromatography system.

It is therefore an object of the invention to circumvent some of the above mentioned disadvantages and drawbacks.

SUMMARY

One or more of the above objects, and further possible objects that can be construed from the disclosure below, are met by a first aspect of the invention constituted by a rotary valve comprising a stator with an inner stator face, and a rotor with an inner rotor face arranged in sealing contact with the inner stator face. The rotor is rotatably movable to a plurality of rotor positions about a rotational axis relative to the inner stator face. The stator comprises a first port in fluidic contact with a first orifice at the inner stator face, a second port in fluidic contact with a second orifice at the inner stator face, a third port in fluidic contact with a third orifice at the inner stator face, a fourth port in fluidic contact with a fourth orifice at the inner stator face, a fifth port in fluidic contact with a fifth orifice at the inner stator face, a sixth port in fluidic contact with a sixth orifice at the inner stator face, a seventh port in fluidic contact with a seventh orifice at the inner stator face, and an eight port in fluidic contact with an eight orifice at the inner stator face. The rotor comprises two or more rotor interconnection paths for selective fluidic interconnection of said orifices with respect to the rotor position and wherein the rotor interconnection paths are arranged to: in a first rotary position connect the first orifice to the fourth orifice, the second orifice to the third orifice, and the eight orifice to the seventh orifice. The rotor interconnection paths are further arranged to: in a second rotary position connect the first orifice to the fourth orifice, the second orifice to the third orifice, the eight orifices to the fifth orifice, and the sixth orifice to the seventh orifice. The rotor interconnection paths are further arranged to: in a third rotary position connect: the eight orifice to the third orifice, the fourth orifice to the fifth orifice, and the sixth orifice to the seventh orifice.

The above objects and further possible objects are further met by a second aspect of the invention constituted by a chromatography system comprising: a rotary valve according to the first aspect of the invention, a syringe connected to the first port, a waste connected to the second port, a loop in a first end connected to the third port, and in a second end connected to the fourth port. The chromatography system further comprises a column connected in a first end to the fifth port and in a second end connected to the sixth port, a post column flow path connected to the seventh port, and a system pump connected to the eighth port. The rotary valve is configured to: in a first rotary position connect the syringe to the second end of the loop, the waste to the first end of the loop, the system pump to the post column flow path. The rotary valve is configured to in a second rotary position connect the syringe to the second end of the loop, the waste to the first end of the loop, the system pump to the first end of the column, the second end of the column to the post column flow path. The rotary valve is configured to in a third rotary position connect the system pump to the first end of the column, the second end of the loop to the first end of the column, and the second end of the column to the post column flow path.

An advantage with the present invention is that the rotary valve obviates the need for separate injection valves and column valves.

Another advantage with the present invention is that an automated chromatography system may be provided.

Further objects and advantages will be apparent for a skilled person from the detailed description and the drawings.

DETAILED DESCRIPTION

Figure 1:
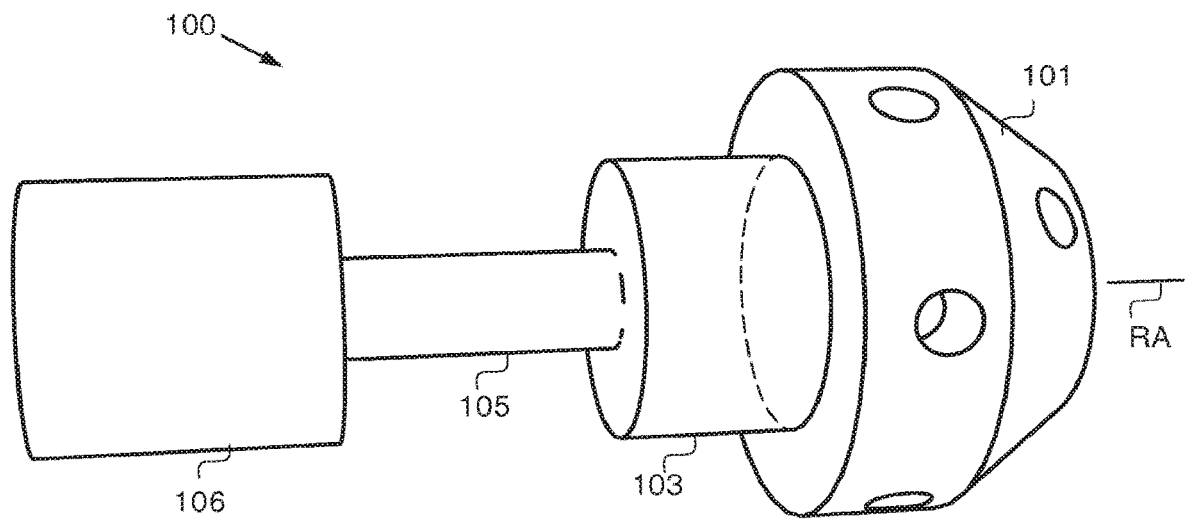
FIG. 1 is a schematic perspective drawing of a rotary valve.

The main parts of a typical rotary valve 100 are schematically shown in FIG. 1 (wherein no brackets or similar load carrying or fastening elements are shown). The rotary valve 100 has a stator 101, a rotor 103, a rotary shaft 105 that optionally may be provided with means (not shown) for recognizing its angular position and a driving unit 106 typically comprising a gear box and a motor (although a valve also may be operated manually). The rotor is rotatable with respect to the stator around a rotary axis RA of the valve.

The stator 101, which is fixed with respect to the instrument into which it is built, is provided with ports for fluid communication with a fluid source/outlet and any component with which the valve is to co-operate. The ports may be positioned on any suitable part of the stator, and in any suitable direction. The ports are provided with means to connect capillaries or tubing. Such means may be of any suitable type, such as conventional Valco fittings well known to anyone skilled in the art. The ports are via channels in fluid communication with a corresponding set of orifices on an inner stator face 202, i.e. the surface of the stator that during operation is in contact with the rotor 103.

The rotor 103 is typically formed as a disc and has an inner rotor face 401 that is pressed against the flat inner stator face 202 during operation to achieve sealing contact there between. The inner rotor face 401 is provided with one or more interconnection paths which interconnect different orifices of the inner stator face 202 depending on the rotary position of the rotor with respect to the stator. The interconnection paths may be any type of path capable of providing fluidic contact between two orifices, and may be comprised of an internal channel with discrete orifices, grooves in the inner rotor face or the like.

Figure 2:
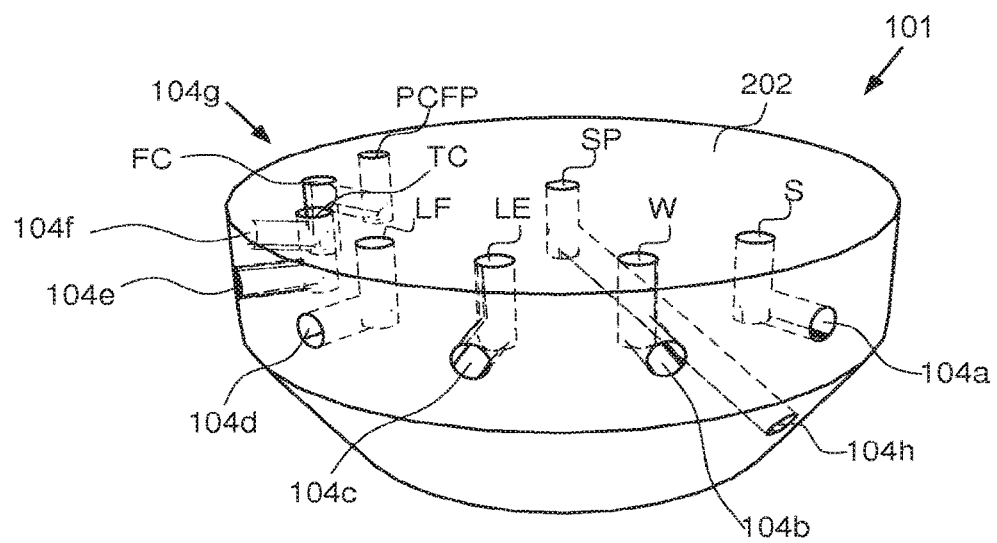
FIG. 2 is s schematic perspective drawing of a stator.

FIG. 2 illustrates an embodiment of a stator 101. The stator 101 comprises an inner stator face 202. On the inner stator face 202 are eighth orifices provided. The stator 101 further comprises a first port 104a in fluidic contact with a first orifice S at the inner stator face 202, a second port 104b in fluidic contact with a second orifice W at the inner stator face 202, a third port 104c in fluidic contact with a third orifice LE at the inner stator face 202. The stator 101 further comprises a fourth port 104d in fluidic contact with a fourth orifice LF at the inner stator face 202, a fifth port 104e in fluidic contact with a fifth orifice TC at the inner stator face 202, a sixth port 104f in fluidic contact with a sixth orifice FC at the inner stator face 202, a seventh port 104g in fluidic contact with a seventh orifice PCFP at the inner stator face 202, and an eighth port 104g in fluidic contact with an eight orifice SP at the inner stator face 202.

SP at the inner stator face 202;

An eigth port 104h is in fluidic contact with an eigth orifice SP at a center of the inner stator face 202.

The first orifice S to the seventh orifice PCFP may be distributed in numerical order from the first orifice to the seventh orifice around the eigth orifice SP in a circle. The neighbouring orifices may be equidistantly distributed in the circle.

Figure 3:
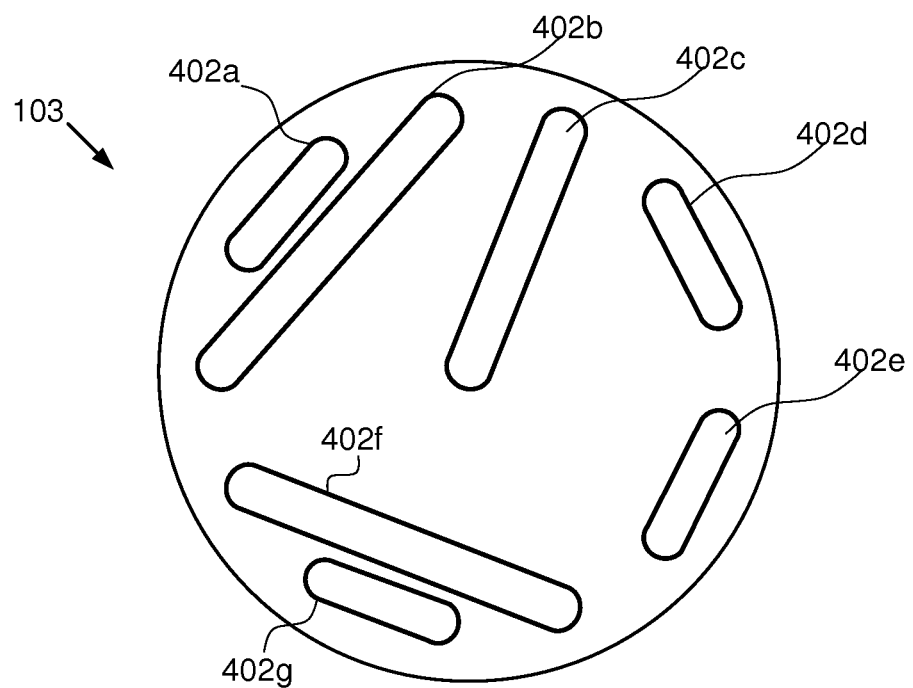
FIG. 3 is a drawing of an inner rotor face of a rotor.

FIG. 3 illustrates the inner rotor face 401 in an end view. The inner rotor face comprises at least one interconnection path (402a-402g) of the above mentioned type configured to connect at least two orifices on the inner stator face 202.

Figure 4:
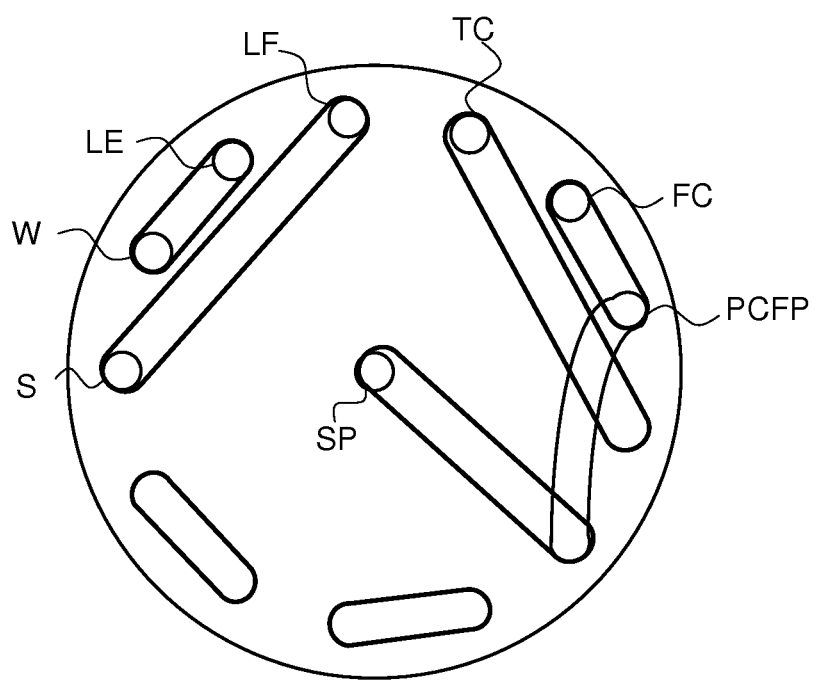
FIG. 4 is a schematic drawing of the interface plane between the stator and the rotor.
Figure 5:
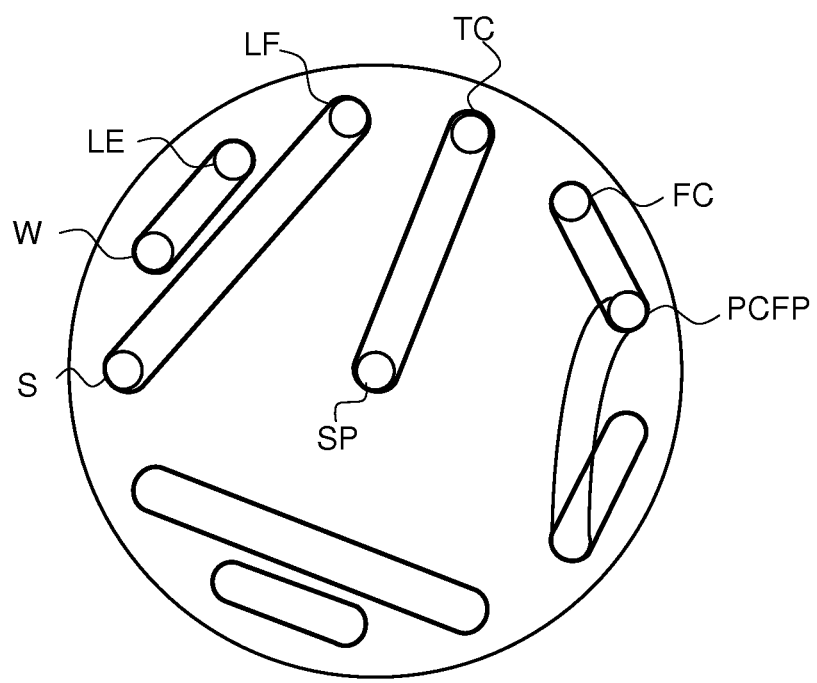
FIG. 5 is a schematic drawing of the interface plane between the stator and the rotor.

FIG. 4 is a planar view of an interface plane between the inner stator face 202 and the inner rotor face 401. This view illustrates a first rotary position wherein the rotor interconnection paths are arranged to connect the first orifice S to the fourth orifice LF, the second orifice W to the third orifice LE, and the eigth orifice SP to the seventh orifice PCFP;

FIG. 5 is a planar view of an interface plane between the inner stator face 202 and the inner rotor face 401. This view illustrates a second rotary position wherein the rotor interconnection paths are arranged to connect the first orifice S to the fourth orifice LF, the second orifice W to the third orifice LE, the eigth orifice SP to the fifth orifice TC, and the sixt orifice FC to the seventh orifice PCFP.

Figure 6:
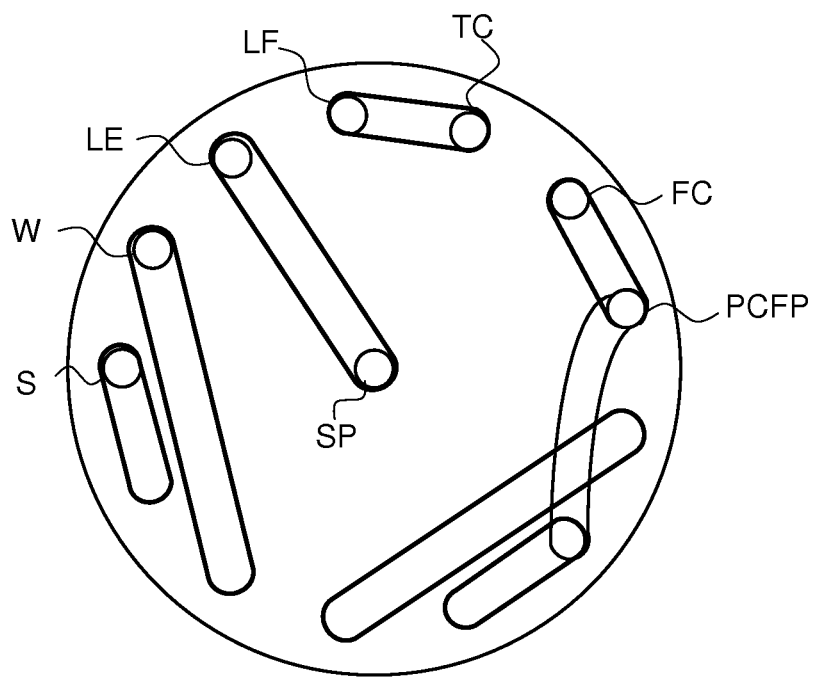
FIG. 6 is a schematic drawing of the interface plane between the stator and the rotor.

FIG. 6 is a planar view of an interface plane between the inner stator face 202 and the inner rotor face 401. This view illustrates a third rotary position wherein the rotor interconnection paths are arranged to connect the eigth orifice SP to the third orifice LE, the fourth orifice LF to the fifth orifice TC, and the sixth orifice FC to the seventh orifice PCFP.

Figure 7:
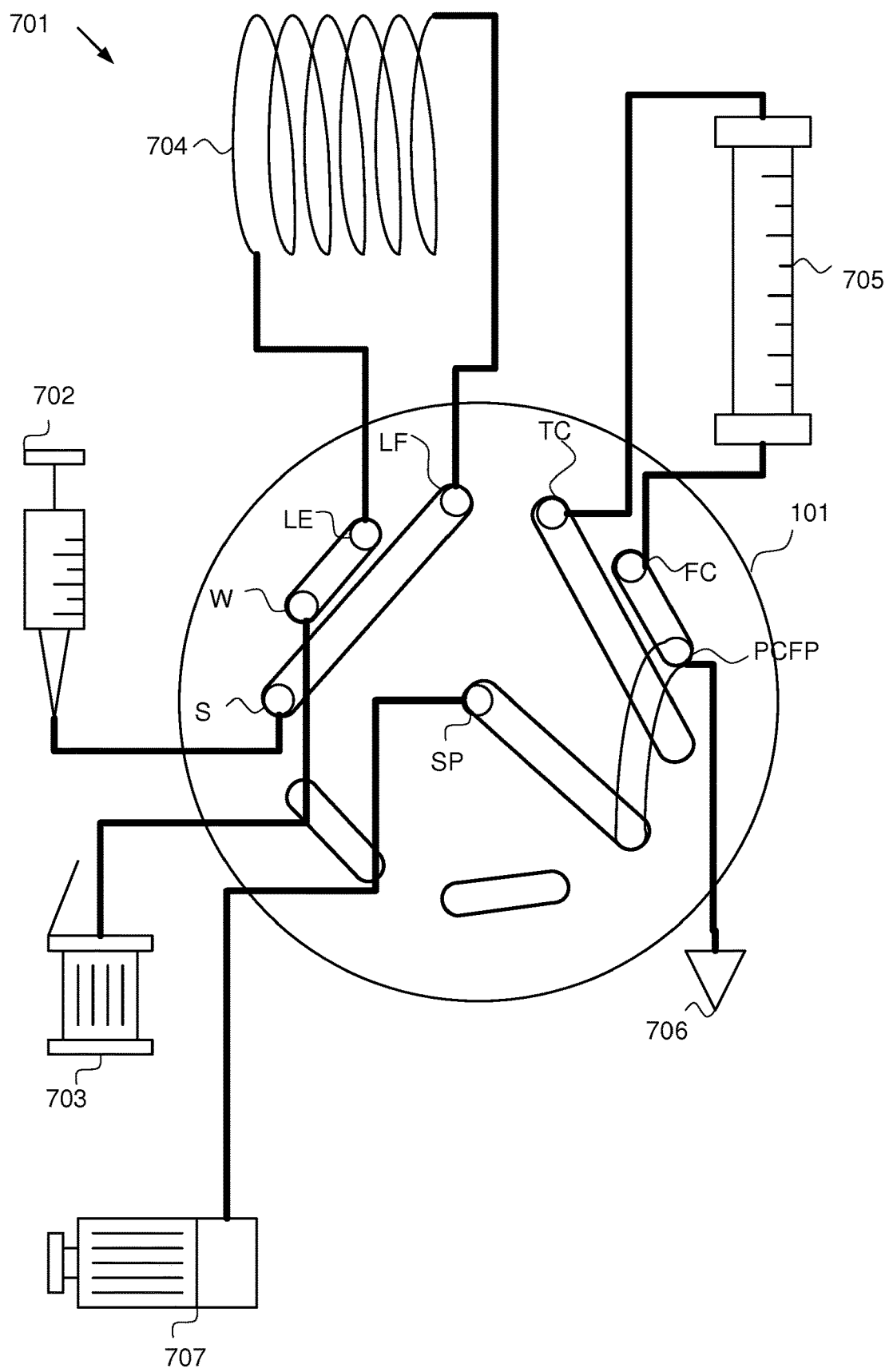
FIG. 7 is a schematic drawing of a chromatography system.

FIG. 7 is a schematic illustration of an embodiment of a chromotography system, generally designated 701. The system comprises a rotary valve 101 of the above mentioned type. A syringe 702 is connected to the first port 104a of the stator 101 causing a fluidic interconnection path to be formed between the syringe 702 and the first orifice S. A waste 703 is connected to the second port 104b of the stator 101 causing a fluidic interconnection path to be formed between the waste and the second orifice W. A first end of a loop 704 is connected to the third port 104c of the stator 103 causing a fluidic interconnection path to be formed between the loop 704 and the third orifice LE. A second end of the loop 704 is connected to the fourth port 104d of the stator 101 causing a fluidic interconnection path to be formed between the loop 703 and the fourth orifice LF. A first end of a column 705 is connected to the fifth port 104e of the stator 101 causing a fluidic interconnection path to be formed between the column 705 and the fifth orifice TC. A second end of the column 705 is connected to the sixth port 104f of the stator 101 causing a fluidic interconnection path to be formed between the column and the sixth orifice FC. A post column flow path 706 is connected to the seventh port 104g causing a fluidic interconnection path to be formed between the seventh orifice PCFP and the post column flow path 706. Finally, a system pump 707 is connected to the eighth port 104h causing a fluidic interconnection path to be formed between the eighth orifice SP and the system pump 707. Furthermore, in FIG. 7 the rotor is in the first rotary position causing the syringe 702 to be connected to the second end of the loop 704, the waste 703 to be connected to the first end of the loop 704, and the system pump connected to the post column flow path 706.

Figure 8:
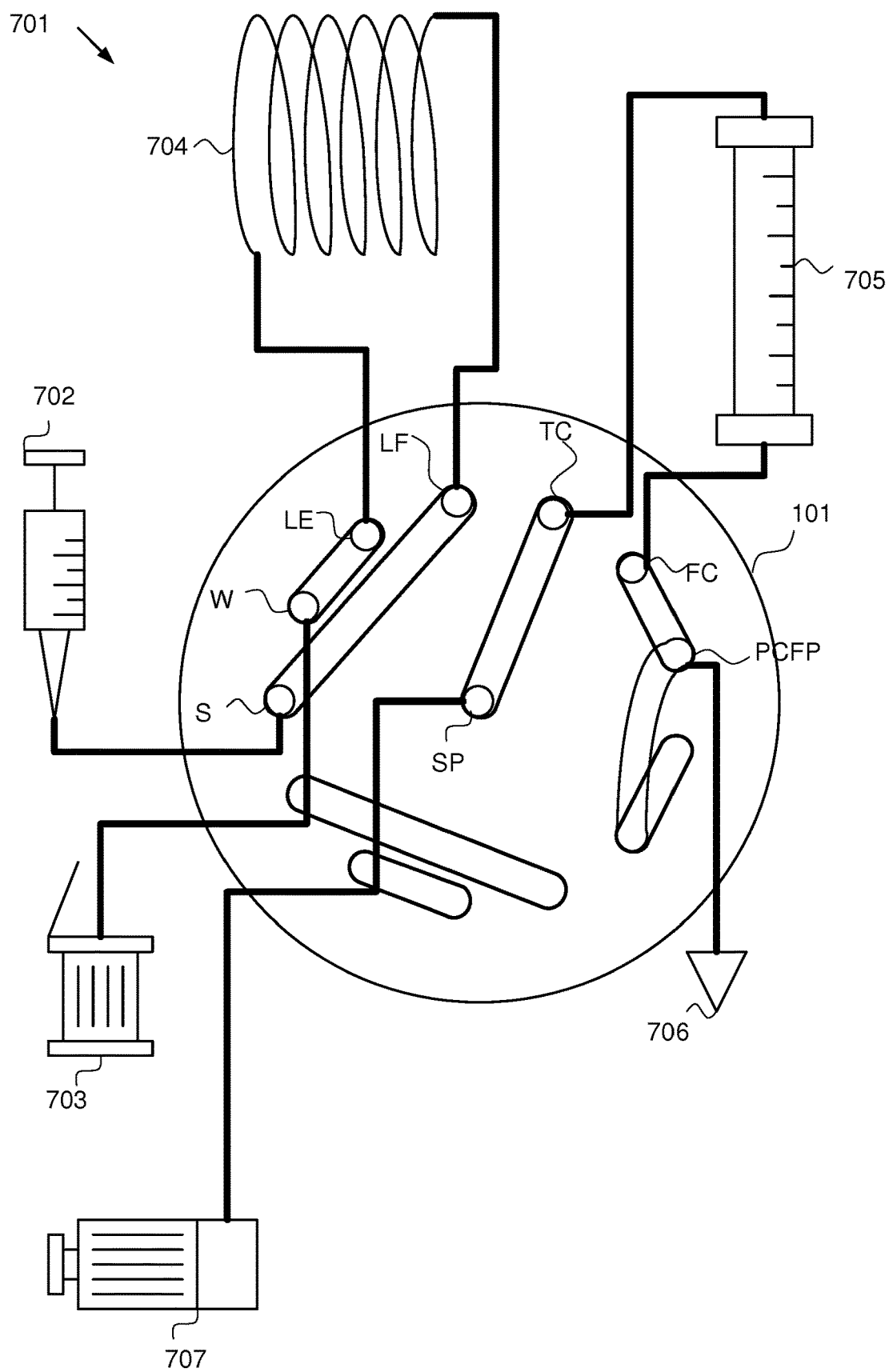
FIG. 8 is a schematic drawing of a chromatography system.

In FIG. 8, the same system 701 as in FIG. 7 is illustrated, the difference between the configuration in the system according to FIG. 7 and the system according to FIG. 8 is that the rotor is in the second rotary position in FIG. 8 causing the syringe 702 to be connected to the second end of the loop 704, the waste 703 to be connected to the first end of the loop 704. Furthermore, the rotor is in the second rotary position causing the system pump 707 to be connected to the first end of the column 705, and the second end of the column to be connected to the post column flow path 706.

Figure 9:
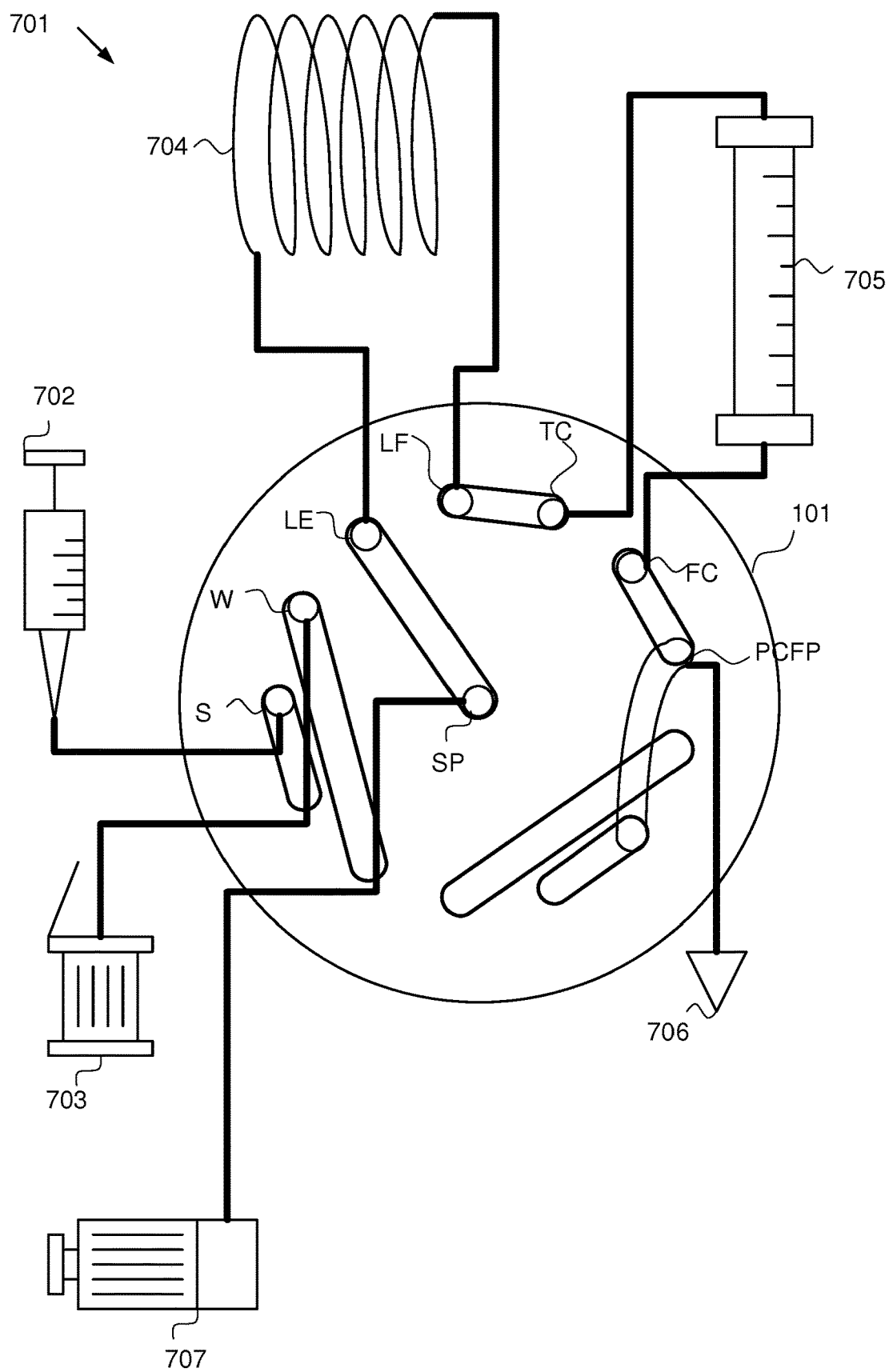
FIG. 9 is a schematic drawing of a chromatography system.

FIG. 9 discloses a system with the rotor in the third rotary position causing the system pump to be connected to the first end of the loop 704, the second end of the loop 704 to be connected to the first end of the column 705, and the second end of the column to be connected to the post column flow path 706.

The chromatography system discussed above solves some of the problems associated with known chromatography system with one conventional rotary valve and the associated manual connections.

The invention claimed is:

1. A rotary valve comprising a stator with an inner stator face, and a rotor with an inner rotor face arranged in sealing contact with the inner stator face, the rotor is rotatable movable to a plurality of rotor positions about a rotational axis relative to the inner stator face, wherein the stator comprises:
    a first port in fluidic contact with a first orifice at the inner stator face;
    a second port in fluidic contact with a second orifice at the inner stator face;
    a third port in fluidic contact with a third orifice at the inner stator face;
    a fourth port in fluidic contact with a fourth orifice at the inner stator face;
    a fifth port in fluidic contact with a fifth orifice at the inner stator face;
    a sixth port in fluidic contact with a sixth orifice at the inner stator face;
    a seventh port in fluidic contact with a seventh orifice at the inner stator face;
    an eighth port in fluidic contact with an eighth orifice at the inner stator face;
    and the rotor comprises two or more rotor interconnection paths for selective fluidic interconnection of said orifices with respect to a respective rotor position of the plurality of rotor positions and wherein the rotor interconnection paths are arranged to:
in a first rotor position of the plurality of rotor positions connect:
    the first orifice to the fourth orifice;
    the second orifice to the third orifice; and
    the eighth orifice to the seventh orifice;
in a second rotary position oldie plurality of rotor positions connect:
    the first orifice to the fourth orifice;
    the second orifice to the third orifice;
    the eighth orifice to the fifth orifice; and
    the sixth orifice to the seventh orifice;
in a third rotary position of the plurality of rotor positions connect:
    the eighth orifice to the third orifice;
    the fourth orifice to the fifth orifice;
    the sixth orifice to the seventh orifice,
wherein the two or more rotor interconnection paths connect at least two circumferentially radially non-adjacent orifices to each other.

2. A rotary valve according to claim 1, wherein one orifice of the first, second, third, fourth, fifth, sixth, seventh, or eighth orifices is provided in the center of the inner stator face, and the other orifices of the first, second, third, fourth, fifth, sixth, seventh, or eighth orifices are provided around the orifice in the center of the inner stator face in a circle.

3. A rotary valve according to claim 2, wherein the eighth orifice is the one orifice arranged in the center of the inner stator face, and the first orifice to the seventh orifice are the other orifices distributed around the eighth orifice in a circle in numerical order from the first orifice to the seventh orifice.

4. A chromatography system comprising a rotary valve according to claim 1, wherein the system further comprises:
    a syringe connected to the first port;
    a waste connected to the second port;
    a loop in a first end connected to the third port, and in a second end connected to the fourth port;
    a column connected in a first end to the fifth port and in a second end connected to the sixth port;
    a post column flow path connected to the seventh port; and
a system pump connected to the eighth port; and
wherein the rotary valve is configured to:
    in a first rotor position of the plurality of rotor positions connect:
        the syringe to the second end of the loop;
        the waste to the first end of the loop; and
        the system pump to the post column flow path;
    in a second rotor position of the plurality of rotor positions connect:
        the syringe to the second end of the loop;
        the waste to the first end of the loop;
        the system pump to the first end of the column;
        the second end of the column to the post column flow path;
    in a third rotor position of the plurality of rotor positions connect:
        the system pump to the first end of the column:
        the second end of the loop to the first end of the column;
        the second end of the column to the post column flow path.

* * * * *